Oct. 21, 1952     D. E. CUCKLER     2,614,433
PORTABLE POWER UNIT

Filed April 28, 1950     3 Sheets-Sheet 1

INVENTOR.
DAVID E. CUCKLER
BY
McMorrow, Berman & Davidson
ATTORNEYS

Oct. 21, 1952 D. E. CUCKLER 2,614,433
PORTABLE POWER UNIT
Filed April 28, 1950 3 Sheets-Sheet 2
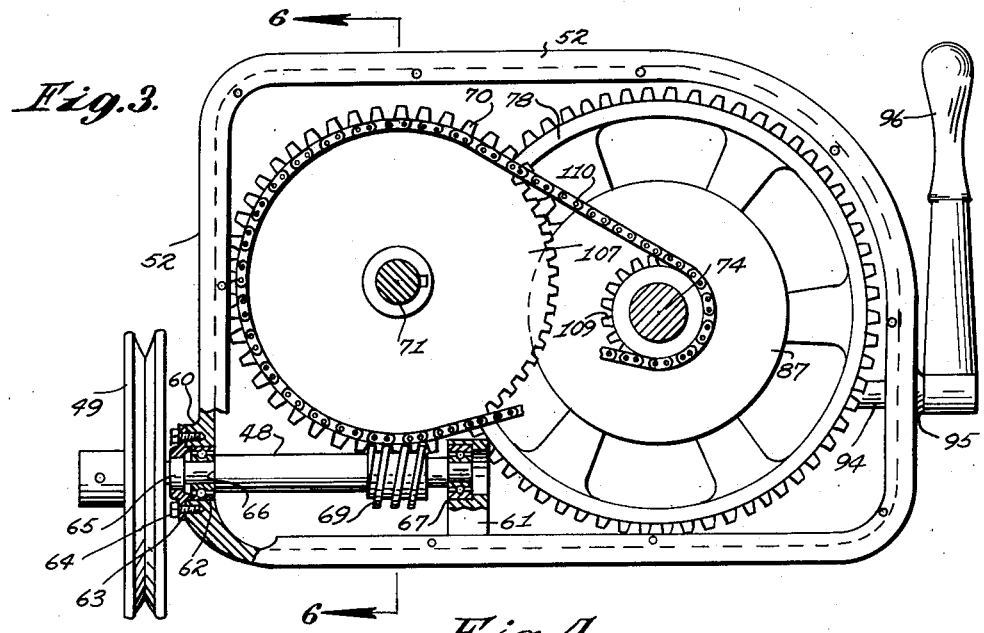
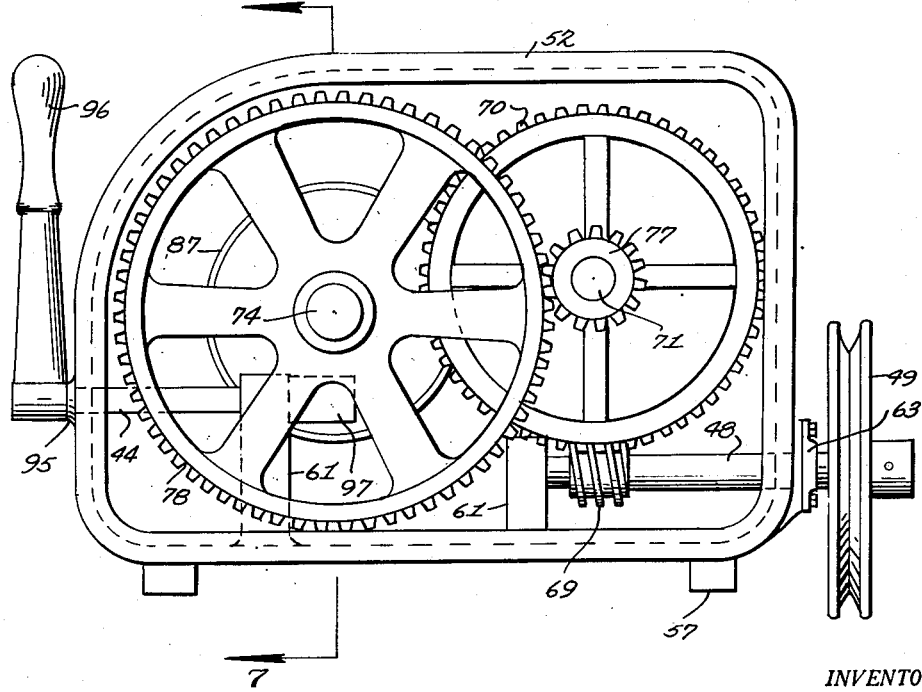
INVENTOR.
DAVID E. CUCKLER
BY
McMorrow, Berman & Davidson
ATTORNEYS Oct. 21, 1952 — D. E. CUCKLER — 2,614,433
PORTABLE POWER UNIT
Filed April 28, 1950 — 3 Sheets-Sheet 3
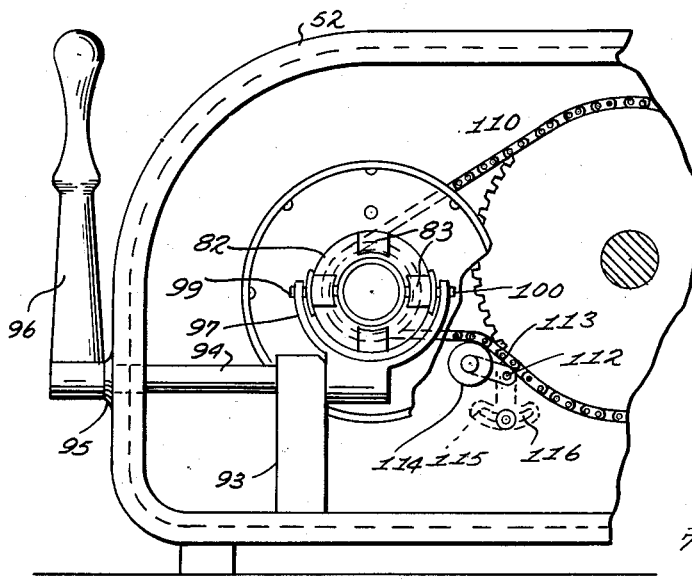
Fig. 5.
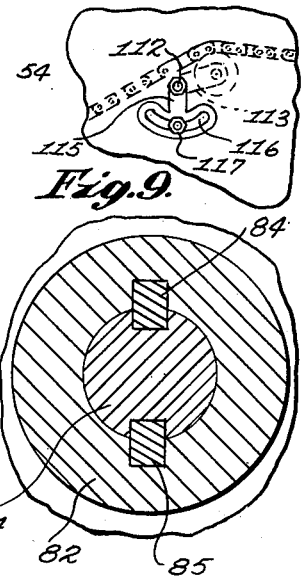
Fig. 8.
Fig. 9.
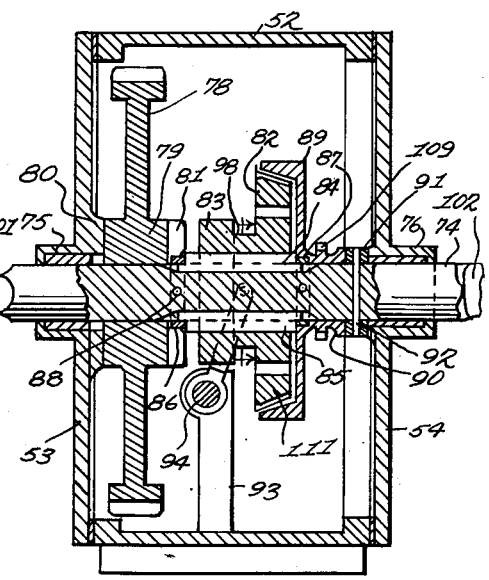
Fig. 6.
Fig. 7.
INVENTOR.
DAVID E. CUCKLER
BY
McMorrow, Berman & Davidson
ATTORNEYS Patented Oct. 21, 1952

2,614,433

UNITED STATES PATENT OFFICE 2,614,433

PORTABLE POWER UNIT

David E. Cuckler, Monticello, Iowa

Application April 28, 1950, Serial No. 158,673

2 Claims. (Cl. 74—16)

This invention relates to an improved portable power unit for driving wagon unloaders, conveyors, and the like, having a novel and improved transmission mechanism.

It is among the objects of the invention to provide an improved portable power unit of the character indicated above which can be conveniently placed on the ground adjacent to such as a wagon to operate the wagon unloader, which is of light weight and easy to handle and requires only a small amount of power for its operation, which can utilize an electric motor or a small internal combustion engine for its motive power or prime mover, which provides a continuous slow speed forward drive and a more rapid reverse drive under selective manual control, which can operate with equal facility at either side of a wagon equipped with an unloader, in which all of the gears are completely enclosed and operate in a bath of lubricant, and which is strong and durable in construction, positive and efficient in operation, and easy to connect to and disconnect from an unloader drive connection.

Other objects and advantages will become apparent from a consideration of the following description and the appended claims in conjunction with the accompanying drawings wherein:

Figure 3 is a side elevational view of the transmission of the portable power device, one of the side cover plates being omitted and portions being broken away and shown in cross section to better illustrate the construction of the transmission;

Figure 4 is a side elevation of the opposite side of the transmission from that illustrated in Figure 3 with the corresponding cover plate removed;

Figure 5 is a transverse cross sectional view on the line 6—6 of Figure 3;

Figure 6 is a transverse cross sectional view on the line 6—6 of Figure 3;

Figure 7 is a cross sectional view on the line 7—7 of Figure 4;

Figure 8 is a side elevational view of a fragmentary portion of the transmission showing a chain tightening device; and Figure 9 is a transverse cross sectional view on an enlarged scale on the line 9—9 of Figure 7.

Figure 1:
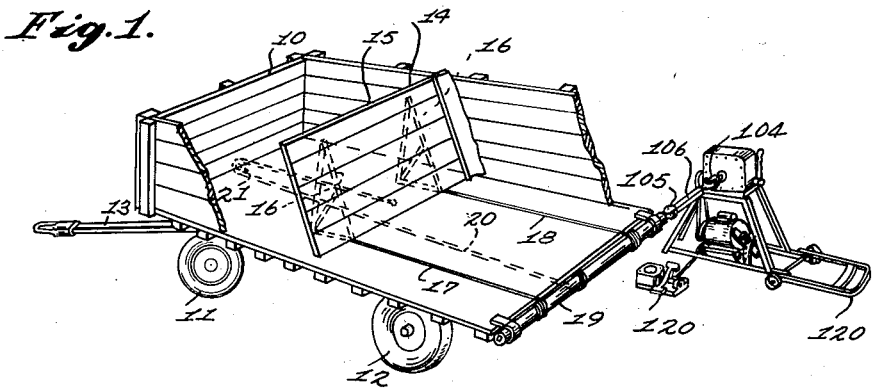
Figure 1 is a diagrammatic perspective view showing a portable power plant illustrative of the invention operatively connected to a wagon unloader mounted on a wagon.

Referring in detail to the drawings, the illustrated wagon has an elongated rectangular bed 10 mounted on a suitable frame supported on steerable front wheels 11 and fixed rear wheels and is provided with a towing tongue 13. The wagon bed is provided with end gates and with a gate 15 which is disposed transversely of the wagon bed or box and is adapted to be displaced longitudinally of the latter from the front to the rear end of the wagon box to push a load out of the rear end of the box, this gate being returned to the front end of the box after the unloading operation.

The movable gate 15 is supported in upright position in the wagon bed by brackets 16 disposed at respectively opposite ends of the gate and is movable rearwardly of the wagon bed or box by a pair of cables 17 and 18 attached each at one end to the gate 15 and wound on a roller 19 journaled at the rear end of the wagon bed. A third cable 20 is connected at one end to the gate 15 and extends from the gate over a sheave 21 located at the front end of the wagon bed and extends rearwardly from this sheave to the roller 19 on which it is wound on in a direction opposite to that in which the cables 17 and 18 are wound on the roller.

With this arrangement, when the roller 19 is rotated in one direction the cables 17 and 18 will be wound onto the roller and the movable gate 15 will be moved from the front to the rear end of the wagon box, the cable 20 being simultaneously wound off of the roller to permit this rearward movement of the movable gate. When the roller 19 is rotated in the opposite direction the cable 20 will be wound onto the roller and the cables 17 and 18 will be wound off of the roller so that the movable gate 15 will be returned from the rear end to the front end of the wagon bed.

As the wagon and the unloader mechanism therefor being of any well known or desired construction and not constituting a part of the present invention except in combination thereof with the novel portable power unit, a more detailed description of the wagon and the unloader mechanism is considered unnecessary for the purposes of the present disclosure.

The portable power unit comprises, in general, a frame 22, a prime mover or motor 23 adjustably mounted on the frame, a transmission 24 and a belt and pulley assembly 25 drivingly connecting the motor 23 to the transmission 24.

The power frame unit comprises two spaced apart lower longitudinal members 26 and 27 interconnected intermediate their length by two spaced apart cross members 28 and 29. An axle 30 extends through apertures provided in the longitudinal members 26 and 27 at one end of the frame and ground engaging wheels 31 and 32 are mounted on this axle at the outer sides of the side frame members 26 and 27 so that the unit can be easily rolled from place to place over the ground.

A post 33 is secured at its lower end to the side member 26 adjacent the wheel axle 30 and while a corresponding post 34 is secured at its lower end to the side member 27 and projects upwardly therefrom. A rear leg 35 is secured to the end of the lower side frame member 26 remote from the axle 30 and is inclined upwardly and toward the post or front leg 33. A top frame member 36 is connected at its opposite ends to the upper ends of the front leg 33 and rear leg 35. A second rear leg 36' is connected to the end of the side member 27 remote from the axle 30 and is inclined forwardly and upwardly toward the upper end of the post 34. An upper frame member, not illustrated, corresponding to the upper frame member 36, is connected at its opposite ends to the upper ends of the front leg 34 and rear leg 36', and two spaced apart, cross members 37 and 38 extend between and are connected to these upper side frame members.

A rectangular motor base plate 40 is mounted on the lower cross members 28 and 29 by four pivotally connected legs 41, 42, 43 and 44. The two legs 41 and 44 are connected to the cross member 28 near the opposite ends of the latter, and the two legs 42 and 43 are connected to the cross member 29 near the opposite ends thereof. At their upper ends the two legs 41 and 42 are pivotally connected to the opposite ends of a bar 45 on which one end of the motor base 40 is secured, and the legs 43 and 44 are connected to a similar bar, not illustrated, on which the opposite end of the motor base is secured. The leg 44 is extended upwardly to provide a handle, and a quadrant 45 is connected to the frame cross member 28 adjacent to the upwardly extended handle 44. This handle carries a spring pressed, manually releasable dog 46 engageable in holes or recesses 47 in the quadrant to secure the motor base 40 in various positions of adjustment crosswise of the frame members 26 and 27.

The motor 23 may be an electric motor, as illustrated, or may be a small internal combustion engine in case the use of an electric motor is not practical because of the absence of electric power facilities.

The transmission 24 is mounted in a housing having two opposite end walls and two opposite side walls, and a drive shaft 48 projects from one end of the transmission housing and carries a V-belt pulley 49. A V-belt pulley 50 is mounted on the shaft of the motor 23 and the two pulleys are drivingly connected by a V-belt 51.

The speed at which the transmission drive shaft 48 is driven by the motor 23 can be manually varied to accommodate the operating speed of the power unit to different operating conditions by swinging the motor 23 side wise relation to the frame side members 26, 27 so as to vary the tension of the belt 51 on the pulleys 49 and 50.

The housing of the transmission 24 is formed in three separable parts and includes a continuous transverse wall part 52 of generally rectangular shape and two side plates 53 and 54 disposed at the opposite sides of the wall 52 and secured to the latter by suitable means, such as the stud bolts 55. The wall 52 is provided on its underside with transversely extending cleats 56 and 57 which are secured on the upper frame cross members 37 and 38, respectively.

For a more detailed illustration and description of the transmission unit reference may now be had to Figures 3 to 9, inclusive.

As is particularly illustrated in Figure 3, the side wall 52 of the housing is provided near the lower end of one of its ends with a tubular boss 60 through which the drive shaft 48 extends. An apertured lug 61 projects upwardly from the bottom of the wall 52 at a location spaced from the boss 60 and receives the inner end of the shaft 48.

A combined axial load thrust and radial load ball bearing 62 is disposed in the boss 61 and is held against movement outwardly of the boss by an apertured cover plate 63 which receives the shaft 48 and is secured to the outer end of the boss by the cap screws 64. A lubricant packing 65 surrounds the shaft 48 and is secured in place by the cover plate 63 which prevents leakage of lubricant from the housing. At the inner end of the bearing 62 the shaft is provided with an annular shoulder 66 which bears against the adjacent edge of the inner race of the thrust bearing to restrain the shaft against movement outwardly of the housing.

A radial thrust ball bearing 67 is secured in the apertured boss 61 and receives a reduced end portion 68 of the shaft 48 to journal the shaft in the lug 61. A worm 69 is provided on the shaft 48 adjacent the lug 61 and this worm meshes with a worm wheel 70. The worm wheel 70 is mounted on a shaft 71 which extends transversely of the housing and is journaled at its respectively opposite ends in bearing bosses 72 and 73 formed on the housing side plates 53 and 54, respectively.

A second shaft 74 extends transversely of the housing at a location spaced from the gear 71 and is journaled in bearing boss formations 75 and 76 on the housing side plates 53 and 54 respectively.

A pinion gear 77 is secured on the shaft 71 adjacent to the worm wheel 70 and rotates with the worm wheel. A gear wheel 78 is rotatably mounted on the shaft 74 and meshes with the pinion 77. The worm wheel 70 is much larger than the worm 69 and the gear wheel 78 is much larger in diameter than the pinion 77 so that a speed reducing drive is provided from the worm shaft 48 to the shaft 74, which is the driven shaft of the transmission, when the gear wheel 78 is drivingly connected to this shaft.

The gear 78 is provided with a hub 79 one side of which bears against an internal boss 80 provided on the side plate 53 surrounding the shaft receiving opening in the bearing boss 75, and the other side of the hub 79 is provided with angularly spaced apart clutch teeth 81.

A combined dog clutch and cone clutch element 82 mounted on the shaft 74 adjacent to the clutch teeth 81 has on one end thereof clutch teeth 83 complementary to the clutch teeth 81 on the gear hub 79, the element 82 being drivingly connected to the shaft 74 for engaging and disengaging movement longitudinally of the shaft by keys 84 and 85 received in key slots provided in the shaft 74 at diametrically opposite sides of the latter and received in corresponding keyways provided in the clutch element 82.

The keys 84 and 85 are notched at their opposite ends to receive rings 86 and 87 to secure the keys in position on the shaft 74. A ring 86 adjacent to the gear hub 79 is pinned to the shaft 74 by a through pin 88 and provides an abutment for the hub 79 of the gear wheel 78.

A cone clutch element 89 is mounted on the shaft 74 at the side of the clutch element 82 remote from the gear wheel 78 and has a hub 90 extending along the shaft 74 toward the side plate 54. A spacing washer 91 surrounds the shaft 74 between the hub 90 and the bearing boss 76 and is connectible with the ring 86 through the cone clutch hub 90, the ring 87, and the keys 84 and 85. This arrangement maintains the shaft 74 against longitudinal movement relative to the side plates of the housing. The spacer ring 91 is pinned to the shaft 94 by a through pin 92 extending diametrically through the spacer ring and the shaft.

A lug 93 extends upwardly from the bottom of the housing side wall 52 and is provided at its upper or inner end with a bearing aperture. A clutch operating shaft 94 is journaled in the aperture in the lug 93 and extends through an apertured boss 95 on the end wall of the housing wall 52 opposite the end wall provided with the boss 60 through which the shaft 48 extends. A handle 96 is fixed to the shaft 94 at the outer side of the housing wall 52 and a clutch operating fork 97 is fixed on this shaft at the side of the lug 93 remote from the boss 95 and partly surrounds the clutch element 82. The clutch element 82 is provided intermediate its length with an annular groove 98 and the clutch fork is provided with pins 99 and 100 which engage in the groove 98 whereby the clutch element is moved longitudinally of the shaft 74 when the handle 96 is rocked in one direction or the other.

When the handle 96 is rocked in one direction the clutch element 82 is moved to engage its dog clutch teeth 83 with the dog clutch teeth 81 of the gear wheel 78 to drivingly connect the gear wheel 78 to the shaft 74. Under these conditions, rotation of the transmission drive shaft 48 by the motor 23 will drive the shaft 74 at a reduced speed in a forward direction.

The shaft 74 is provided externally of the housing side plates 53 and 54 with squared ends 101 and 102 and a squared sleeve 103 is mountable on either one of these squared ends. A universal joint 104 is carried by the squared sleeve 103, and a second universal joint 105 is drivingly connected to one end of the unloader roller 19. A longitudinally extensible drive shaft 106 is connected between the universal joints 104 and 105 to provide a driving connection between the shaft 74 and the roller 19.

The above described mechanism is operative to move the unloader gate 15 in an unloading direction when the clutch is engaged to connect the gear wheel 78 to the shaft 74 and the motor 23 is in operation.

A sprocket wheel 107 is fixed on the shaft 71 and 13 drivingly connected to the shaft 71 by a key 108 which may also be used to drivingly connect the worm gear 70 to this shaft, and a chain sprocket wheel 109 is provided on the hub 90 of the cone clutch element 89 which cone clutch element is freely rotatable on shaft 74.

A sprocket chain 110 connects the sprocket wheel 107 with the sprocket wheel 109 and continuously drives the cone clutch element 89 while the motor 23 is in operation.

The sprocket wheel 107 is materially larger than the sprocket wheel 109 to provide a speed increasing drive between the shaft 71 and the shaft 74.

The clutch element 82 has a cone portion 111 which is engageable with the cone element 89 when the handle 96 is rocked in the direction opposite that effective to engage the dog clutch teeth 81 and 83. When the cone 111 is engaged with the cone clutch element 89 the sprocket wheel 109 is drivingly connected to the shaft 74 to drive the shaft 74 in a reverse direction and at a higher speed than that in which the shaft is driven by the gear wheel 78.

The sprocket wheels and drive chain thus provide a high speed reverse drive for the shaft 74 to rapidly return the unloading gate 15 from the rear to the front end of the wagon box, and the cone clutch provides a safety feature in that it will slip and avoid damage to the mechanism if the movable gate reaches the front end of the wagon box before the motor 23 is shut off.

When the handle 96 is placed in its center or neutral position, neither the cone clutch nor the dog clutch is engaged and the shaft 74 is then freely rotatable in the housing. This facilitates connecting the portable power unit with the unloader mechanism and also provides a means for discontinuing the drive when desired.

A chain tightener is provided for the drive chain 110 and comprises a shaft 112 journaled in a boss provided on the side plate 54, an arm 113 secured at one end to the shaft 112 at the inner side of the housing side plate, and a roller 114 journaled on the distal end of the arm 113 and bearing against the under side of the chain 110. An arm 115 is secured at one end to the end of shaft 112 at the outer side of the side plate 54 and is provided at its distal end with an elongated, arcuate slot 116. A headed stud bolt 117 extends through the slot 116 and is threaded into a tapped hole in the side plate 54 to clamp the arms 115 and 113 in adjusted position to apply the proper amount of chain tightening pressure between the roller 114 and the chain 110.

Figure 2:
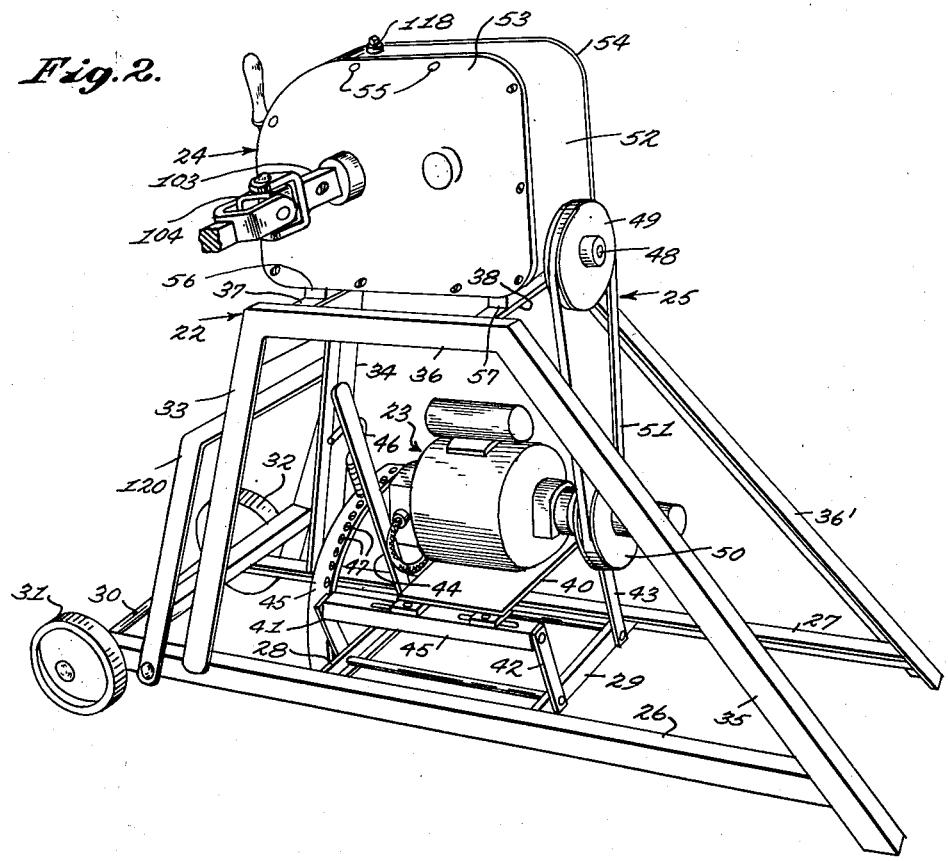
Figure 2 is a perspective view of the portable power unit.

Suitable filler, drain and oil level plugs are provided in the housing 24 for maintaining the proper quantity of lubricant therein, the filler plug being indicated at 118 in Figure 2.

Where the motor provided for the power unit is an electric motor, as illustrated, a foot operated start and stop switch 120 may be connected into the motor energizing circuit and positioned for convenient operation by the operator of the power unit so that the power unit can be started and stopped as may be desired.

A rack 120 is pivotally connected to the frame adjacent the axle 30 and may be swung from a position against the front legs 33 and 34 to a position in which it extends outwardly from the axle end of the frame to receive weights for counterbalancing excessive torque developed by the power unit.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In a portable power unit a transmission comprising a housing, a first shaft journaled in said housing and projecting therefrom, a second shaft journaled in said housing and disposed substantially at right angles to said first shaft, a worm and gear drive between said first and second shafts, a pinion and a sprocket wheel secured on said second shaft for rotation therewith, a third shaft journaled in said housing substantially parallel to said second shaft and projecting at its ends from said housing, a gear wheel larger than the pinion on said second shaft rotatably mounted on said third shaft and meshing with the pinion on said second shaft, a sprocket wheel smaller than the sprocket wheel on said second shaft rotatably mounted on said third shaft, a chain drivingly connecting the sprocket wheel on said second shaft with the sprocket wheel on said third shaft, clutch means mounted on said third shaft and selectively engageable with the gear wheel and sprocket wheel mounted on said third shaft to drivingly connect either said gear wheel or said sprocket wheel to said third shaft, and manually operative means connected to said clutch means and projecting from said housing.

2. In a portable power unit a transmission unit comprising a closed housing, a drive shaft journaled in said housing and projecting therefrom, a second shaft journaled in said housing adjacent said drive shaft, a speed reducing drive between said drive and second shafts, a third shaft journaled in said housing at a location spaced from said second shaft, a two way clutch assembly on said third shaft, a speed reducing drive between said second shaft and said clutch assembly, a speed increasing drive between said second shaft and said clutch assembly effective when drivingly connected to said third shaft to drive the latter in a direction opposite that in which said third shaft is driven by said speed reducing drive when operatively connected to said third shaft, and manually operated means connected to said clutch assembly and projecting from said housing for actuating said clutch assembly to drivingly connect either said speed reducing drive or said speed increasing drive to said third shaft.

DAVID E. CUCKLER.

REFERENCES CITED

The following references are of record in the file of this patent:

UNITED STATES PATENTS

| Number | Name | Date |
| --- | --- | --- |
| 1,949,015 | Hallenbeck | Feb. 27, 1934 |
| 2,314,549 | Milbrath | Mar. 23, 1943 |
| 2,446,645 | Flinchbaugh | Aug. 10, 1948 |
| 2,477,065 | Kuert et al. | July 26, 1949 |
| 2,522,960 | Price | Sept. 19, 1950 |

FOREIGN PATENTS

| Number | Country | Date |
| --- | --- | --- |
| 410,283 | Germany | Mar. 7, 1925 |
| 889,890 | France | Jan. 21, 1944 |